United States Patent
Jung et al.

(10) Patent No.: US 10,313,975 B2
(45) Date of Patent: *Jun. 4, 2019

(54) APPARATUS AND METHOD FOR REDUCING POWER CONSUMPTION IN PORTABLE TERMINAL

(71) Applicant: Samsung Electronics Co., Ltd., Suwon-si, Gyeonggi-do (KR)

(72) Inventors: Bu-Seop Jung, Suwon-si (KR); Jong-Mu Choi, Gunpo-si (KR); Jung-Hun Lee, Suwon-si (KR); Jae-Ki You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,695

(22) Filed: Oct. 11, 2018

(65) Prior Publication Data
US 2019/0045446 A1    Feb. 7, 2019

Related U.S. Application Data

(63) Continuation of application No. 15/925,167, filed on Mar. 19, 2018, now Pat. No. 10,129,829, which is a continuation of application No. 14/329,290, filed on Jul. 11, 2014, now Pat. No. 9,924,461, which is a continuation of application No. 12/969,767, filed on Dec. 16, 2010, now Pat. No. 8,805,317.

(30) Foreign Application Priority Data

Dec. 21, 2009  (KR) .................. 10-2009-0127813

(51) Int. Cl.
  H04B 1/16    (2006.01)
  H04W 52/02   (2009.01)
  H04L 27/00   (2006.01)

(52) U.S. Cl.
  CPC ..... H04W 52/0229 (2013.01); H04W 52/028 (2013.01); H04W 52/0216 (2013.01); *H04L 27/0006* (2013.01); *Y02D 70/00* (2018.01); *Y02D 70/142* (2018.01); *Y02D 70/168* (2018.01); *Y02D 70/22* (2018.01)

(58) Field of Classification Search
  CPC ......... H04W 52/0229; H04W 52/0216; H04W 52/028; H04L 27/0006; Y02D 70/22; Y02D 70/00; Y02D 70/142; Y02D 70/168
  See application file for complete search history.

(56) References Cited

U.S. PATENT DOCUMENTS 7,769,414 B2   8/2010  Yoon et al.
7,961,694 B1   6/2011  Chan et al.
(Continued)

FOREIGN PATENT DOCUMENTS

KR   10-2007-0012140 A   1/2007
WO   2008/023638 A1      2/2008

*Primary Examiner* — Walli Z Butt
(74) *Attorney, Agent, or Firm* — Jefferson IP Law, LLP (57) ABSTRACT

An apparatus and a method for reducing power consumption in a portable terminal that transmits digital broadcast data through an ad hoc network are provided. If a terminal receiving digital broadcast transmits the received digital broadcast to a neighboring terminal, a control unit enters a sleep mode after buffering received data for a predefined time.

20 Claims, 6 Drawing Sheets

(56) References Cited

U.S. PATENT DOCUMENTS

| | | | |
|---|---|---|---|
| 8,805,317 B2 * | 8/2014 | Jung | H04W 52/0216 455/343.2 |
| 9,167,527 B2 | 10/2015 | Song et al. | |
| 9,485,735 B2 | 11/2016 | Song et al. | |
| 9,693,310 B2 | 6/2017 | Song et al. | |
| 9,854,530 B2 | 12/2017 | Song et al. | |
| 9,924,461 B2 * | 3/2018 | Jung | H04W 52/0216 |
| 10,129,829 B2 * | 11/2018 | Jung | H04W 52/0216 |
| 2005/0009512 A1 * | 1/2005 | Rue | H04L 12/12 455/420 |
| 2005/0049013 A1 * | 3/2005 | Chang | H04W 52/0216 455/574 |
| 2005/0190767 A1 | 9/2005 | Lee et al. | |
| 2005/0233789 A1 | 10/2005 | Maekawa | |
| 2007/0159992 A1 | 7/2007 | Kim | |
| 2007/0248034 A1 * | 10/2007 | Hsu | H04W 52/028 370/318 |
| 2008/0004044 A1 * | 1/2008 | Simpson | H04W 52/0216 455/458 |
| 2008/0043656 A1 | 2/2008 | Yoon et al. | |
| 2008/0069021 A1 * | 3/2008 | Chhabra | H04M 1/7253 370/311 |
| 2008/0107056 A1 | 5/2008 | Choi et al. | |
| 2008/0182567 A1 * | 7/2008 | Zhu | H04W 52/0216 455/418 |
| 2009/0010191 A1 * | 1/2009 | Wentink | H04W 52/0216 370/311 |
| 2009/0262663 A1 | 10/2009 | Gosset et al. | |
| 2010/0278087 A1 | 11/2010 | Kawakami et al. | |
| 2010/0279714 A1 | 11/2010 | Chin et al. | |
| 2011/0007678 A1 | 1/2011 | Kneckt et al. | |
| 2011/0090833 A1 * | 4/2011 | Kneckt | H04L 12/1854 370/312 |
| 2014/0148158 A1 | 5/2014 | Cho et al. | |
| 2015/0358911 A1 | 12/2015 | Song et al. | |
| 2017/0127355 A1 | 5/2017 | Song et al. | |

* cited by examiner

APPARATUS AND METHOD FOR REDUCING POWER CONSUMPTION IN PORTABLE TERMINAL

CROSS-REFERENCE TO RELATED APPLICATION(S)

This application is a continuation application of Ser. No. 15/925,167, filed on Mar. 19, 2018, which is a continuation of a prior application Ser. No. 14/329,290, filed on Jul. 11, 2014, which has issued as U.S. Pat. No. 9,924,461 on Mar. 20, 2018, which is a continuation of prior application Ser. No. 12/969,767, filed on Dec. 16, 2010, which has issued as U.S. Pat. No. 8,805,317 on Aug. 12, 2014, and which claimed the benefit under 35 U.S.C § 119(a) of a Korean patent application filed on Dec. 21, 2009 in the Korean Intellectual Property Office and assigned Serial number 10-2009-0127813, the entire disclosures of each are hereby incorporated by reference.

BACKGROUND OF THE INVENTION

1. Field of the Invention

The present invention relates to an apparatus and a method for reducing power consumption in a portable terminal that transmits digital broadcast data through an ad hoc network. More particularly, the present invention relates to an apparatus and a method for buffering received data in a portable terminal and transmitting the buffered data after maintaining a sleep state for a predefined time.

2. Description of the Related Art

Recently, portable terminals have become necessities to many people without distinction of age and gender, and service providers and terminal manufacturers are competitively developing products (or services) for differentiation from other enterprises.

For example, portable terminals have evolved into multimedia devices that can provide various functions and services including any or all of phone book functions, game functions, a Short Message Service (SMS), an Electronic (E)-mail services, morning call functions, Motion Picture Expert Group Audio Layer-3 (MP3) functions, scheduling functions, digital camera functions, multimedia message services, wireless Internet services, and the like.

WiFi terminals with a wireless Local Area Network (LAN) function have recently been released. The WiFi terminals with a wireless LAN function are used to access e-mail, Web and string media. WiFi provides a wireless broadband Internet access service to users, thus making it possible to rapidly and conveniently access an on-line network during movement as well as at home and office.

The WiFi network may be divided into an ad hoc network, which provides direct communication between WiFi terminals without passing through an Access Point (AP), and an infra network based on the AP.

When a terminal with a digital broadcast receiving module and terminals without a digital broadcast receiving module are connected through an ad hoc network to each other, the terminal with a digital broadcast receiving module transmits broadcast data to the terminals without a digital broadcast receiving module, thereby enabling the sharing of the digital broadcast.

Because the ad hoc network does not provide an AP, each of the terminals generates/transmits a beacon notifying the existence of a network. When approaching the Target Beacon Transmission Time (TBTT), the terminals generate a beacon after a random delay time.

That is, the terminals wake up at the TBTT to monitor a physical channel of the ad hoc network for a random delay time set in each terminal. The terminal immediately cancels the beacon transmission if another terminal generates a beacon before it transmits a beacon.

When a beacon interval starts, the terminals wake up for an Announcement Traffic Indication Message (ATIM) window interval to transmit a beacon frame. If there is data communication between transmitting/receiving terminals, the terminals must maintain a wake-up state. On the other hand, if there is no data communication between the transmitting/receiving terminals, the terminals enter a sleep mode for the remaining interval except an ATIM window in the beacon interval, thus minimizing the power consumption.

As described above, if the terminal receives a TeleVision (TV) channel through an ad hoc network and immediately retransmits the same to a receiving terminal, it continuously receives several mixed broadcast channels. Therefore, if the broadcast data are retransmitted thorough WiFi, there is no period to stop the operation of a receiver. Accordingly, it cannot enter a sleep mode until the completion of transmission of digital broadcast data, thereby increasing the power consumption.

Therefore, a need exists for an apparatus and a method for reducing power consumption in a portable terminal that transmits digital broadcast data through an ad hoc network.

SUMMARY OF THE INVENTION

An aspect of the present invention is to address at least the above-mentioned problems and/or disadvantages and to provide at least the advantages below. Accordingly, an aspect of the present invention is to provide an apparatus and a method for reducing power consumption in a portable terminal that transmits digital broadcast data through an ad hoc network.

Another aspect of the present invention is to provide an apparatus and a method for reducing power consumption in a portable terminal by increasing a sleep period when retransmitting data through an ad hoc network.

Another aspect of the present invention is to provide an apparatus and a method for reducing the number of times of performing a periodic wake-up operation for monitoring an Announcement Traffic Indication Message (ATIM) frame in a portable terminal when there is no data communication between transmitting/receiving terminals.

In accordance with an aspect of the present invention, an apparatus for reducing power consumption in a portable terminal connected through an ad hoc network is provided. The apparatus includes a control unit for entering a sleep mode after buffering received data for a predefined time, if a terminal receiving digital broadcast transmits the received digital broadcast to a neighboring terminal.

In accordance with another aspect of the present invention, a method for reducing power consumption in a portable terminal connected through an ad hoc network is provided. The method includes entering a sleep mode after buffering received data for a predefined time, if a terminal receiving digital broadcast transmits the received digital broadcast to a neighboring terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspect, features, and advantages of certain exemplary embodiments of the present invention will

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for reducing power consumption in a portable terminal by increasing a sleep period when retransmitting data through an ad hoc network. Exemplary embodiments of the present invention also provide an apparatus and a method for reducing the number of times of performing a periodic wake-up operation for monitoring an Announcement Traffic Indication Message (ATIM) frame in a portable terminal when there is no data communication between transmitting/receiving terminals.

FIGS. 1 through 6C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
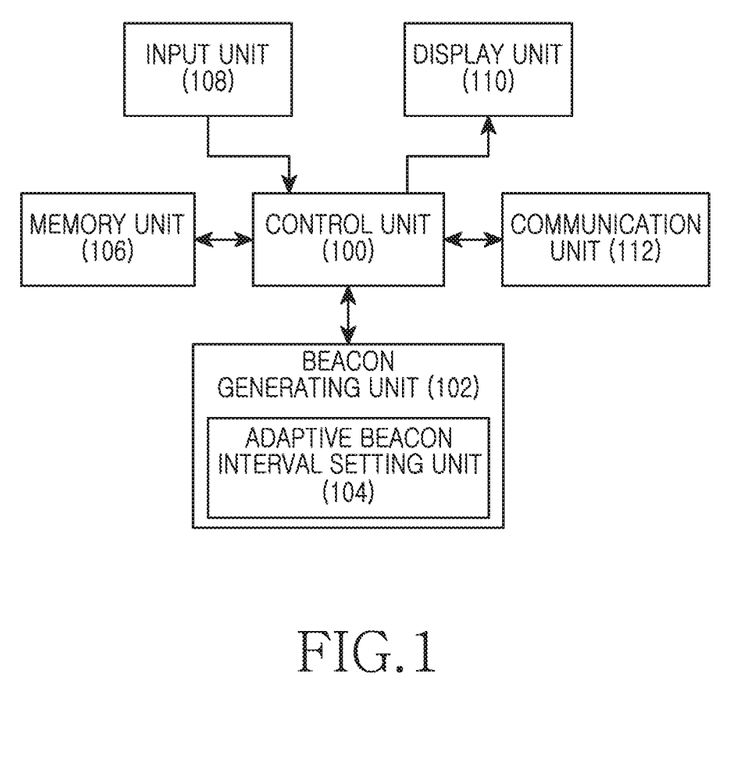
FIG. 1 is a block diagram of a portable terminal that minimizes power consumption by increasing a sleep period when retransmitting data through an ad hoc network according to an exemplary embodiment of the present invention.

FIG. 1 is a block diagram of a portable terminal that minimizes power consumption by increasing a sleep period when retransmitting data through an ad hoc network according to an exemplary embodiment of the present invention.

Referring to FIG. 1, a portable terminal may include a control unit 100, a beacon generating unit 102, a memory unit 106, an input unit 108, a display unit 110, and a communication unit 112. The beacon generating unit 102 may include an adaptive beacon interval setting unit 104. The portable terminal may include additional units that are not illustrated here merely for the sake of clarity. Similarly, the functionality of two or more of the above units may be integrated into a single component.

The control unit 100 of the portable terminal controls an overall operation of the portable terminal. For example, the control unit 100 processes and controls voice communication and data communication. In addition to the typical functions, according to an exemplary embodiment of the present invention, the control unit 100 minimizes power consumption when retransmitting digital broadcast data through an ad hoc network, by setting a target delay time for transmission of retransmission data and buffering/transmitting data for only a portion of the set time while maintaining a sleep state for the remaining time.

In addition, after transmitting the buffered data, the control unit 100 generates an adaptive beacon interval prior to transmission in order to reduce power consumption caused by a wake-up operation in an ATIM window.

Herein, the adaptive beacon interval denotes the interval indicating the ATIM frame nonexistence interval among the retransmission data transmission time except the buffered data transmission interval, which corresponds to the data transmission interval minus the buffered data transmission time. Accordingly, after detecting the adaptive beacon interval, portable terminals may enter a sleep mode by determining that there is no ATIM frame for the adaptive beacon interval.

Herein, the control unit 100 may set the adaptive beacon interval immediately after transmitting buffered data or at the time when preoccupying a beacon after transmission of the buffered data.

The beacon generating unit 102 generates a beacon corresponding to a frame for notifying the existence of a network or performing a network maintenance function. According to an exemplary embodiment of the present invention, the beacon generating unit 102 generates a beacon including the adaptive beacon interval. That is, the beacon generating unit 102 generates a beacon including the adaptive beacon interval set by the adaptive beacon interval setting unit 104, so that portable terminals enter a sleep mode due to the nonexistence of the ATM frame.

The adaptive beacon interval setting unit 104 generates an adaptive beacon interval, which represents the ATIM frame nonexistence interval among the retransmission data transmission time except the buffered data transmission interval, and provides the same to the beacon generating unit 102. Herein, the control unit 100 may set the adaptive beacon interval immediately after transmitting buffered data or at the time when the portable terminal preoccupies a beacon after transmission of the buffered data.

The memory unit 106 may include any or all of a Read Only Memory (ROM), a Random Access Memory (RAM) a flash ROM, and the like. The ROM stores a variety of reference data and microcodes of a program for the process and control of the control unit 100 and the beacon generating unit 102.

The RAM is a working memory of the control unit 100, which stores temporary data that are generated during the execution of various programs. The flash ROM stores a variety of updatable data, such as a phone book, an outgoing message, an incoming message, and the like.

The input unit 108 includes numeric keys of digits 0-9 and a plurality of function keys, such as a Menu key, a Cancel (delete) key, a Confirmation key, a Talk key, an End key, an Internet connection key, Navigation keys (or Direction keys), character input keys, and the like. The input unit 108 provides the control unit 100 with key input data that corresponds to a key pressed by a user.

The display unit 110 may display any or all of numerals and characters, moving pictures, still pictures, status information generated during an operation of the portable terminal, and the like. The display unit 110 may be a color Liquid Crystal Display (LCD), an Active Mode Organic Light Emitting Diode (AMOLED), and the like. If the display unit 110 has a touch input device and is applied to a touch input type portable terminal, it can be used as an input device.

The communication unit 112 transmits/receives Radio Frequency (RF) signals inputted/outputted through an antenna (not illustrated). For example, in a transmitting (TX) mode, the communication unit 112 channel-encodes, spreads and RF-processes TX data prior to transmission. In a receiving (RX) mode, the communication unit 112 converts a received RF signal into a baseband signal and despreads and channel-decodes the baseband signal to restore the original data. According to an exemplary embodiment of the present invention, the communication unit 112 transmits/receives a beacon including the adaptive beacon interval.

The control unit 100 of the portable terminal may also be configured to perform the functions of the beacon generating unit 102. Although separate units are provided for respective functions of the control unit 100, the control unit 100 may also be configured to perform all or some of the functions on behalf of such separate units.

Figure 2:
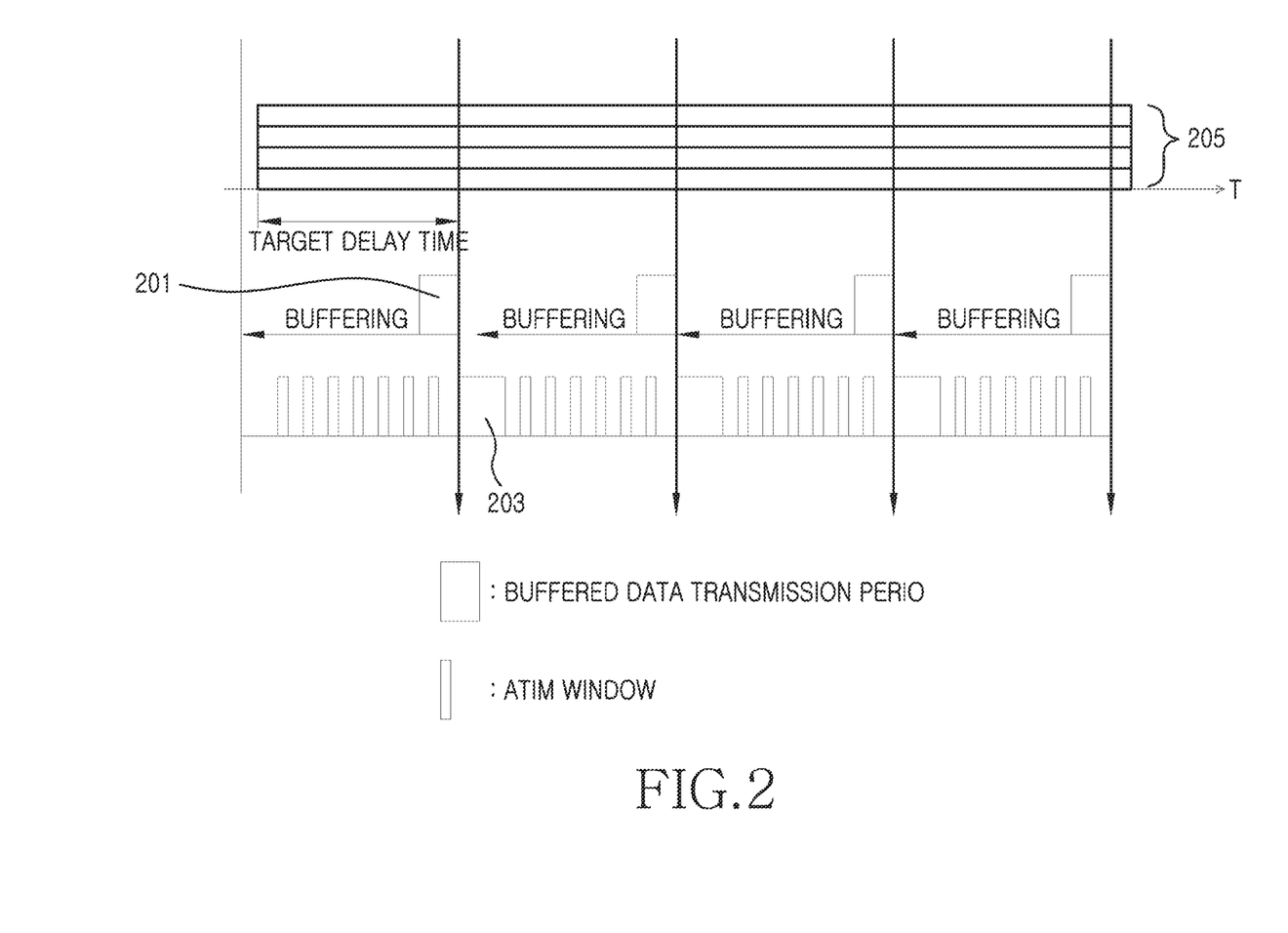
FIG. 2 is a diagram illustrating a process for transmitting digital broadcast data in a portable terminal according to an exemplary embodiment of the present invention.

FIG. 2 is a diagram illustrating a process for transmitting digital broadcast data in the portable terminal according to an exemplary embodiment of the present invention.

Referring to FIG. 2, a portable terminal buffers received data and transmits the buffered data after maintaining a sleep state for a predefined time, in order to reduce power consumption caused by the transmission of data without a sleep mode.

When the portable terminal transmits received data (205) to terminals connected through an ad hoc network, it sets a target delay time corresponding to a retransmission data transmission time. Herein, the target delay time denotes the interval for transmission of the buffered data after the buffering of the data for a predefined time in order to solve the problem of the need to perform a wake-up operation because it continuously transmits the digital broadcast data at a low data rate.

Accordingly, the portable terminal buffers (201) and transmits (203) the retransmission data for a portion of the target delay time and enters a sleep mode for the remaining time, thereby minimizing the power consumption.

Figure 3:
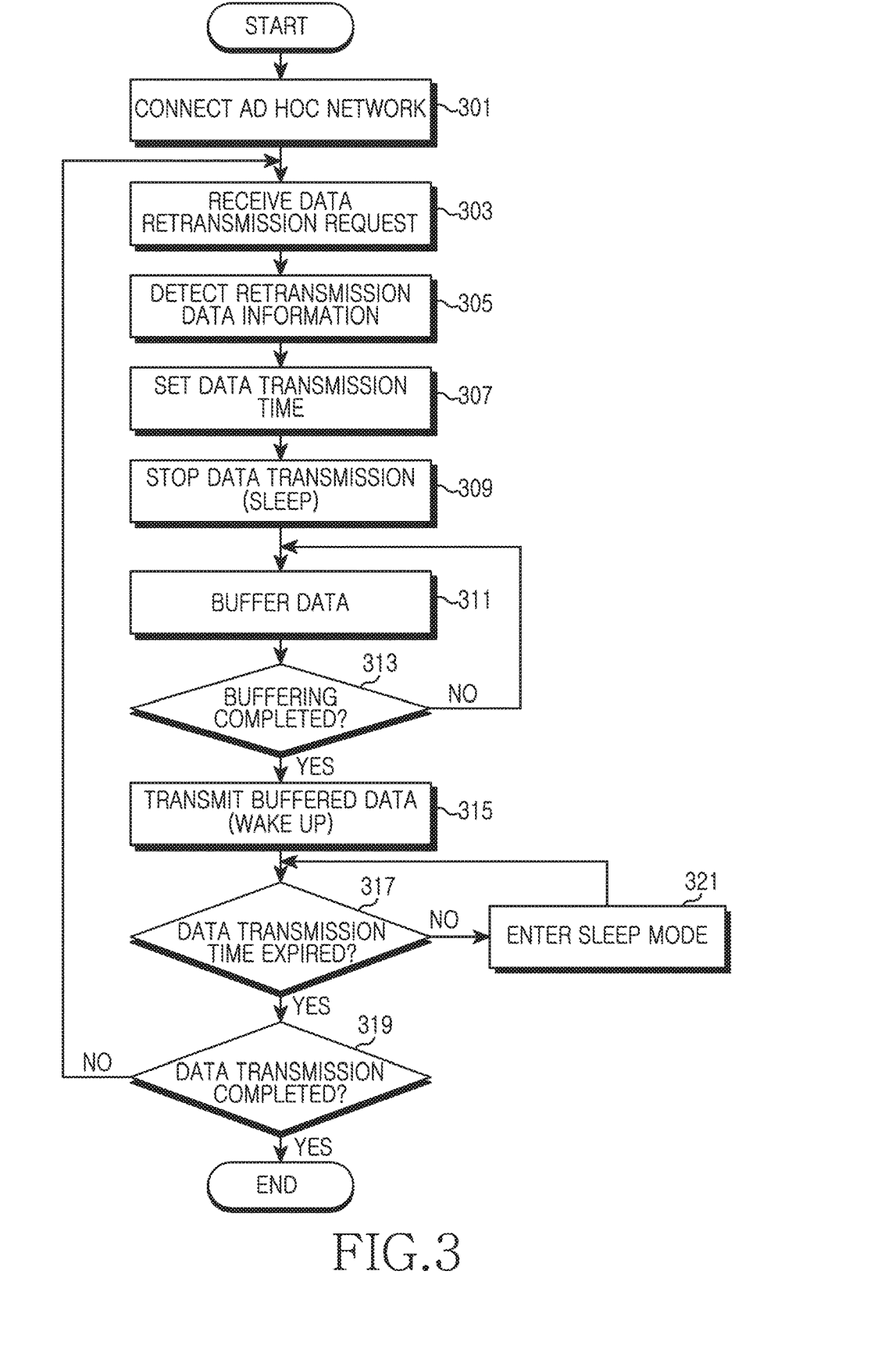
FIG. 3 is a flowchart illustrating a process for transmitting digital broadcast data in a portable terminal according to an exemplary embodiment of the present invention.

FIG. 3 is a flowchart illustrating a process for transmitting digital broadcast data in a portable terminal according to an exemplary embodiment of the present invention.

Referring to FIG. 3, a portable terminal transmits digital broadcast data through an ad hoc network to terminals incapable of receiving digital broadcast, and retransmits digital broadcast data of a specific channel whose retransmission is requested by a receiving terminal. According to an exemplary embodiment of the present invention, when transmitting the digital broadcast data, the portable terminal uses a portion of the target delay time as a data buffering time and enters a power saving mode for the remaining time except the buffered data transmission interval, thereby reducing the power consumption.

In step 301, the portable terminal connects to neighboring portable terminals through an ad hoc network. In step 303, the portable terminal receives a data retransmission request from a receiving terminal sharing the digital broadcast data with the portable terminal. Herein, the data retransmission request denotes a request that causes a terminal, incapable of receiving digital broadcast data, to receive digital broadcast and transmits the received data to other portable terminals.

In step 305, the portable terminal detects data information to be retransmitted. In step 307, the portable terminal sets a target delay time corresponding to a retransmission data transmission time. Herein, the target delay time denotes the interval (i.e., the data transmission time) for transmission of the buffered data after the buffering of the data for a predefined time in order to solve the problem of the need to perform a wake-up operation because it continuously transmits the digital broadcast data at a low data rate.

If the portable terminal sets the data transmission time to be long, there is an increase in the delay between a transmitting terminal and a receiving terminal, thus inconveniencing the user viewing digital broadcast. Therefore, the portable terminal sets the data transmission time according to the characteristics of digital broadcast. That is, the portable terminal may set the data transmission time to be short in the case of broadcast, such as news, and may increase the data transmission time up to the buffering allowable capacity level in the case of broadcast channels, such as movies that is not sensitive to delay. In addition, when retransmitting time-slice transmitted Digital Video Broadcasting—Handheld (DVB-H) data, the portable terminal may transmit a movie channel in an increased data transmission interval without the need to set the data transmission time in a predefined data transmission interval (Delta-T).

In step 309, the portable terminal enters a sleep mode for the data transmission time set in step 307 and stops data transmission, in order to reduce power consumption caused by a continuous wake-up operation during the data retransmission.

In step 311, for a predefined time, the portable terminal buffers digital broadcast data to be transmitted to the receiving terminal requesting the data retransmission. In step 313, the portable terminal determines whether the buffering of the digital broadcast data has completed. That is, in step 313, the portable terminal determines whether a predefined time for buffering the digital broadcast data has expired. When retransmitting the digital broadcast data, a conventional portable terminal must perform a continuous wake-up operation. However, the portable terminal, according to an exemplary embodiment of the present invention, maintains a sleep state and wakes up for a predefined time to buffer the digital broadcast data.

If it is determined in step 313 that the buffering of the digital broadcast data has not completed, the portable terminal returns to step 311 to again perform a digital broadcast data buffering operation.

In contrast, if it is determined in step 313 that the buffering of the digital broadcast data has completed, the portable terminal proceeds to step 315. In step 315, the portable terminal transmits the buffered data. In step 317, the portable terminal determines whether the data transmission time set in step 307 has expired.

If it is determined in step 317 that the data transmission time has not expired, the portable terminal proceeds to step 321 to enter a sleep mode and then returns to step 317. That is, when transmitting the digital broadcast data, the portable terminal wakes up for only a portion of the predefined data transmission time to buffer/transmit data to be retransmitted and enters a sleep mode for the remaining time, thereby reducing the power consumption.

In contrast, if it is determined in step 317 that the data transmission time has expired, the portable terminal proceeds to step 319. In step 319, the portable terminal determines whether the data transmission has completed.

If it is determined in step 319 that the data transmission has not completed, the portable terminal returns to step 303.

In contrast, if it is determined in step 319 that the data transmission has completed, the portable terminal ends the algorithm.

Figure 4:
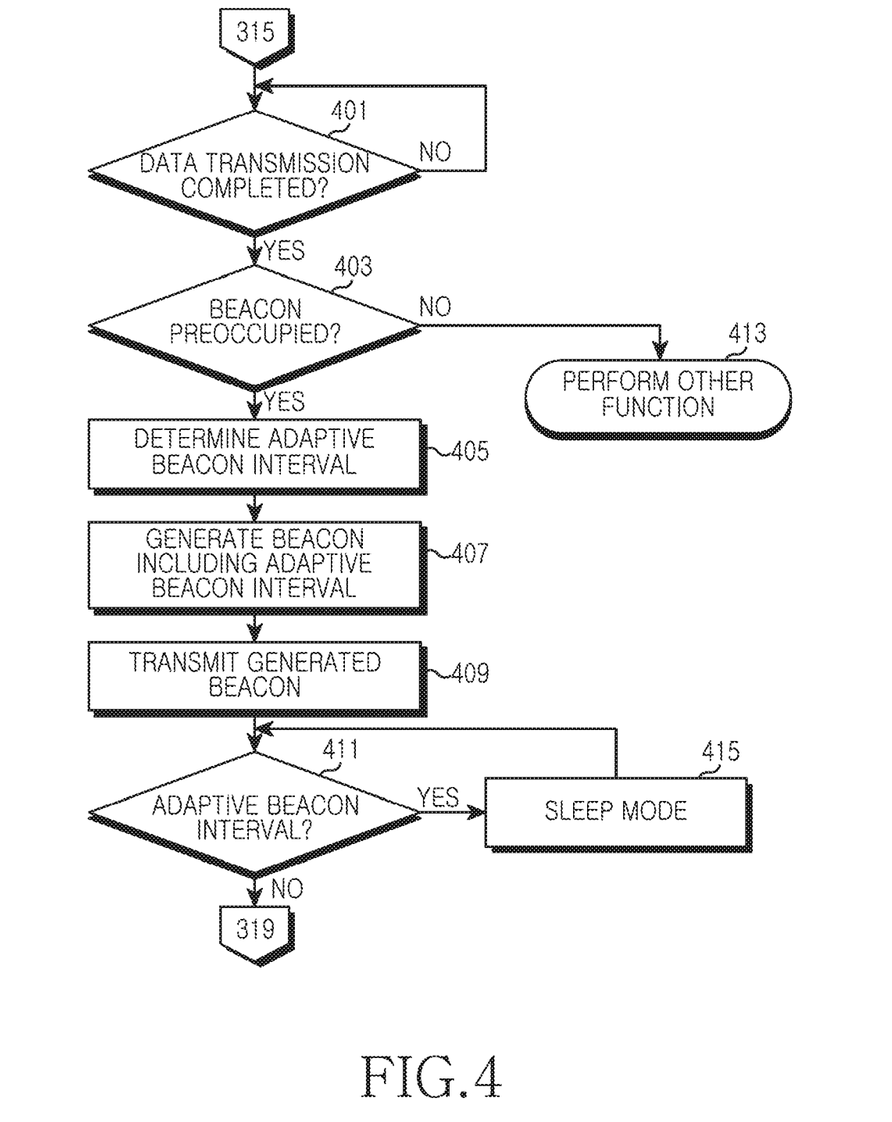
FIG. 4 is a flowchart illustrating a process for setting an adaptive beacon interval in a portable terminal according to an exemplary embodiment of the present invention.

FIG. 4 is a flowchart illustrating a process for setting an adaptive beacon interval in a portable terminal according to an exemplary embodiment of the present invention.

Referring to FIG. 4, an adaptive beacon interval denotes the interval indicating the ATIM frame nonexistence interval among the retransmission data transmission time (described with reference to FIG. 3) except the buffered data transmission interval, which corresponds to the data transmission interval minus the buffered data transmission time. If there is no data communication between transmitting/receiving terminals, the portable terminal reduces the power consumption by reducing the number of times of performing a periodic wake-up operation for monitoring an ATIM frame.

In step 401, the portable terminal determines whether the transmission of the data, the retransmission of which is requested by the receiving terminal, has completed.

If it is determined in step 401 that the data transmission has not completed, the portable terminal again performs step 401.

In contrast, if it is determined in step 401 that the data transmission has completed, the portable terminal proceeds to step 403. In step 403, the portable terminal determines whether a beacon is preoccupied. That is, in step 403, the portable terminal determines whether the portable terminal transmitting the data beforehand generates a beacon.

If it is determined in step 403 that a beacon is not preoccupied, the portable terminal proceeds to step 413 to perform other function (e.g., an operation of receiving a beacon generated by other terminal).

In contrast, if it is determined in step 403 that a beacon is preoccupied, the portable terminal proceeds to step 405. In step 405, the portable terminal determines the adaptive beacon interval. The adaptive beacon interval denotes the ATIM frame nonexistence interval among the data transmission time except the buffered data transmission interval, which corresponds to the data transmission interval minus the buffered data transmission time.

In step 407, the portable terminal generates a beacon including the adaptive beacon interval determined in step 405. In step 409, the portable terminal transmits the beacon generated in step 407.

During the adaptive beacon interval, by using the beacon including the adaptive beacon interval, the portable terminals determines that there is no data transmission between transmitting/receiving terminals, and enters a sleep mode without periodically waking up for monitoring the ATIM frame, thereby reducing the power consumption.

In step 411, the portable terminal determines whether it corresponds to an adaptive beacon interval.

If it is determined in step 411 that the portable terminal corresponds to an adaptive beacon interval, the portable terminal proceeds to step 415 to enter a sleep mode by determining that there is no data transmission between the transmitting/receiving terminals, and returns to step 411.

In contrast, if it is determined in step 411 that the portable terminal does not correspond to an adaptive beacon interval, the portable terminal proceeds to step 319 of FIG. 3 to determine whether the data transmission has completed.

Figure 5:
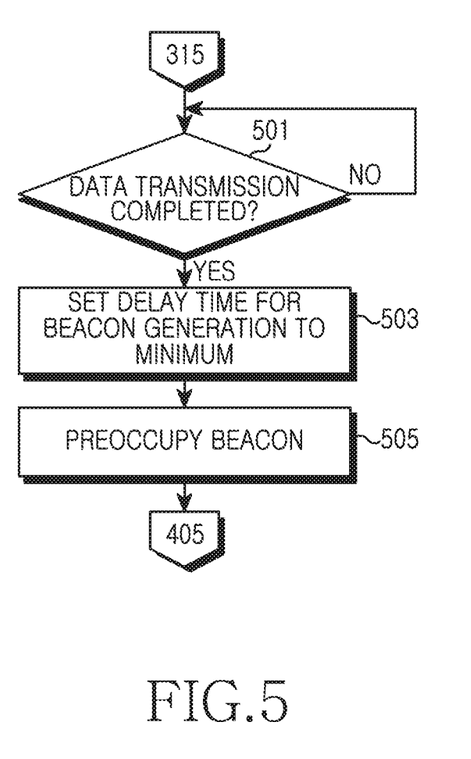
FIG. 5 is a flowchart illustrating a process for preoccupying a beacon after transmission of buffered data in a portable terminal according to an exemplary embodiment of the present invention.

FIG. 5 is a flowchart illustrating a process for preoccupying a beacon after transmission of buffered data in a portable terminal according to an exemplary embodiment of the present invention.

Referring to FIG. 5, a portable terminal sets an adaptive beacon interval by preoccupying a beacon upon completion of buffered data transmission, thereby minimizing the power consumption.

In step 501, the portable terminal determines whether the transmission of the data, the retransmission of which is requested by the receiving terminal, has completed.

If it is determined in step 501 that the data transmission has not completed, the portable terminal again performs step 501.

In contrast, if is determined in step 501 that the data transmission has completed, the portable terminal proceeds to step 503. In step 503, the portable terminal sets a random delay before the generation of a beacon after a Target Beacon Transmission Time (TBTT) is set as a minimum. Step 503 is performed so that the portable terminal preoccupies a beacon upon completion of buffered data transmission to transmit the adaptive beacon interval. That is, the portable terminal removes an ATIM window interval for ATIM frame monitoring by allocating a minimum random delay value before beacon transmission so that the portable terminal can preoccupy a physical channel at the end time point of the buffering data transmission.

Accordingly, the end time point of the adaptive beacon interval corresponds to the time to retransmit buffered data after the end of the previous data transmission time.

In step 505, the portable terminal preoccupies a beacon and returns to step 405 of FIG. 4.

Figure 6A:
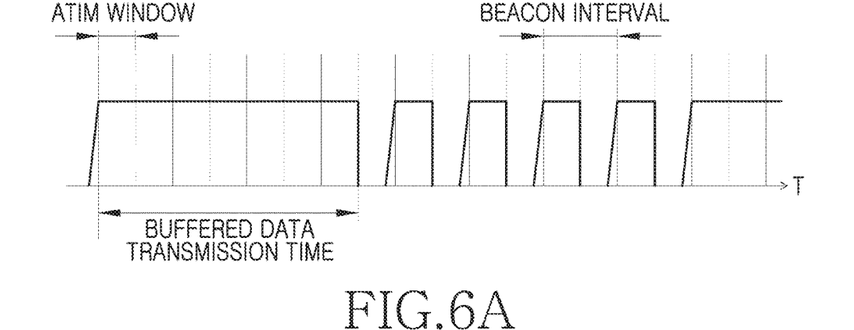
FIG. 6A is a diagram illustrating a process for transmitting digital broadcast data in a portable terminal according to an exemplary embodiment of the present invention.
Figure 6B:
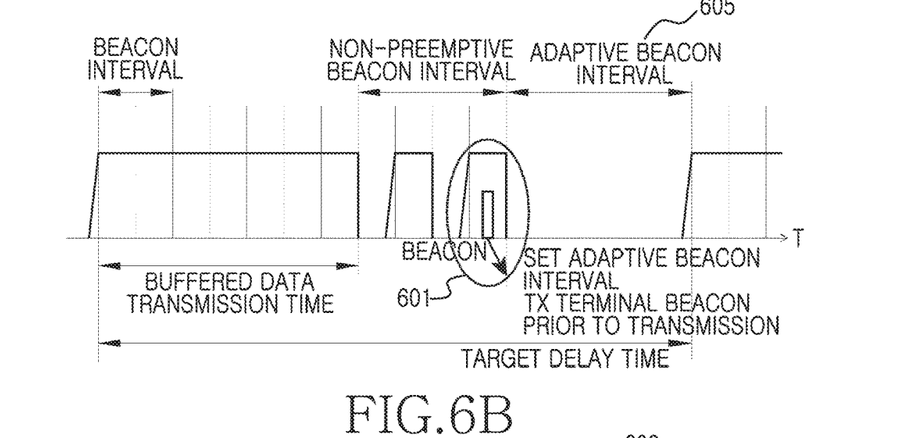
FIG. 6B is a diagram illustrating a process for setting an adaptive beacon interval in a portable terminal according to an exemplary embodiment of the present invention.
Figure 6C:
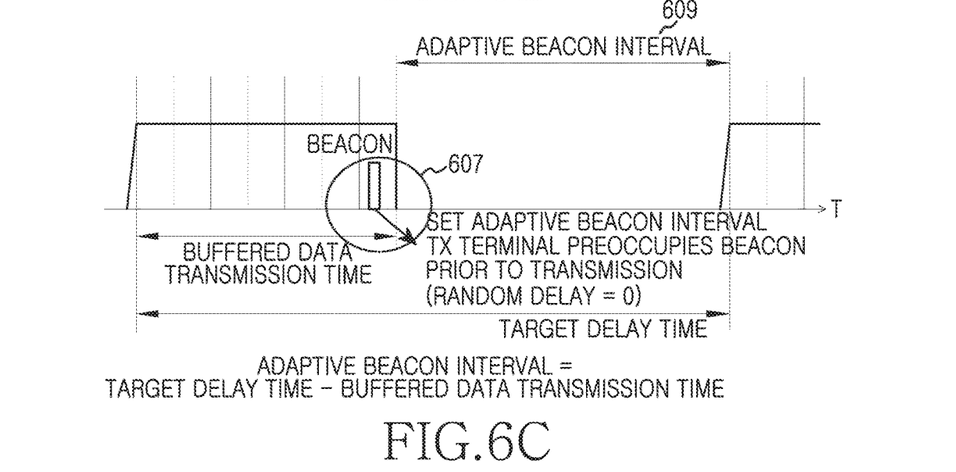
FIG. 6C is a diagram illustrating a process for preoccupying a beacon after transmission of buffered data in a portable terminal according to an exemplary embodiment of the present invention.

FIGS. 6A through 6C are diagrams illustrating a process for reducing power consumption in a portable terminal according to an exemplary embodiment of the present invention.

FIG. 6A is a diagram illustrating a process for transmitting digital broadcast data in a portable terminal according to an exemplary embodiment of the present invention.

Referring to FIG. 6A, while a conventional portable terminal must perform a continuous wake-up operation when retransmitting digital broadcast data, a portable terminal, according to an exemplary embodiment of the present invention, buffers the retransmission data for only a portion of the data transmission time and enters a sleep mode for the remaining time, thereby minimizing the power consumption.

That is, after transmitting the buffered data, the portable terminal repeats a process of waking up an ATIM window for a beacon interval and entering a sleep mode for the remaining period, thereby reducing the power consumption.

FIG. 6B is a flow diagram illustrating a process for setting an adaptive beacon interval in a portable terminal according to an exemplary embodiment of the present invention.

Referring to FIG. 6B, in order to minimize power consumption, a portable terminal reduces the number of times of performing a periodic wake-up operation for monitoring an ATIM frame, if there is no data communication between transmitting/receiving terminals, during the interval among the data transmission time except the buffered data transmission interval.

That is, in order to reduce the power consumption caused by a wake-up operation in an ATIM window, if the portable terminal preoccupies a beacon (601), it sets a periodic adaptive beacon interval indicating the nonexistence of an ATIM frame (605), and then generates/transmits a beacon including the adaptive beacon interval. Herein, the portable terminal generates an adaptive beacon interval, which corresponds to the data transmission interval minus the buffered data transmission time, to reduce the number of times of performing a periodic wake-up operation for monitoring the ATIM frame.

Herein, the end time point of the adaptive beacon interval corresponds to the time to retransmit buffered data after the end of the previous data transmission time. If the portable terminal does not preoccupy the beacon, it periodically wakes up to monitor the ATIM frame. As compared to the case of FIG. 6A, the portable terminal can reduce the power consumption by entering a sleep mode after preoccupying the beacon.

FIG. 6C is a flow diagram illustrating a process for preoccupying a beacon after transmission of buffered data in a portable terminal according to an exemplary embodiment of the present invention.

Referring to FIG. 6C, a portable terminal prevents a periodic wake-up operation from being performed to monitor an ATIM frame, in the period where the beacon is not preoccupied in FIG. 6B.

That is, the portable terminal sets an adaptive beacon interval (609) by preoccupying a beacon (607) immediately after the transmission of buffered data. When determining that the transmission of the data, the retransmission of which is requested by a receiving terminal, is completed, the portable terminal sets a minimum random delay before the generation of a beacon after a TBTT to preoccupy a beacon, thus removing an ATIM window period where the portable terminal wakes up to monitor an ATIM frame.

As described above, exemplary embodiments of the present invention provide an apparatus and a method for reducing power consumption in a portable terminal by increasing a sleep period when retransmitting data through an ad hoc network. Exemplary embodiments of the present invention also provide an apparatus and a method for reducing the number of times of performing a periodic wake-up operation for monitoring an ATIM frame in a portable terminal when there is no data communication between transmitting/receiving terminals. Accordingly, exemplary embodiments of the present invention can reduce power consumption in a portable terminal caused by the continuous transmission of retransmission data without a sleep state.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
    a memory;
    an antenna;
    a communication unit operatively coupled with the antenna and adapted to transmit a signal to an external electronic device using the antenna; and
    a control unit operatively coupled with the communication unit, the control unit adapted to:
        operate in a first state during a first portion of a specified period of time, the operating in the first state including transmitting, using the communication unit, at least one portion of data stored in the memory to the external electronic device during the first portion of the specified period of time, and
        operate in a second state during a second portion of the specified period of time in response to elapsing the first portion, the operating in the second state including transmitting, using the communication unit, time information indicative of a length of the specified period of time to the external electronic device during a first subportion of the second portion of the specified period of time and suspending from transmitting a portion of the data to the external electronic device during the second portion of the specified period of time.

2. The apparatus of claim 1, wherein the control unit is further adapted to:
    transmit the at least one portion of the data from the apparatus to the external electronic device.

3. The apparatus of claim 1, wherein the control unit is further adapted to:
    as at least part of the operating in the first state, operate in a wake-up state during the first portion.

4. The apparatus of claim 3, wherein the control unit is further adapted to:
    as at least part of the operating in the second state, operate in a sleep state during a second subportion of the second portion after the elapse of the first portion and before the first subportion of the second portion.

5. The apparatus of claim 4, wherein the control unit is further adapted to:
    as at least part of the operating in the second state, operate in the wake-up state during a third subportion of the second portion after the elapse of the second subportion and before the first subportion without transmitting a portion of the data or a portion of the time information.

6. The apparatus of claim 5, wherein the control unit is further adapted to:
as at least part of the operating in the second state, operate in the sleep state during a fourth subportion of the second portion after the elapse of the third subportion and before the first subportion.

7. The apparatus of claim 1, wherein the control unit is further adapted to:
as at least part of the operating in the second state, operate in the sleep state after the elapse of the first subportion and until an end of the second portion.

8. The apparatus of claim 1, wherein the control unit is further adapted to:
as at least part of the operating in the second state, buffer another portion of the data during the second portion of the specified period of time.

9. The apparatus of claim 8, wherein the control unit is further adapted to:
operate in the first state during a first portion of another iteration of the specified period of time in response to elapsing the second portion, the operating in the first state during the first portion of the other iteration including transmitting the other portion of the data buffered during the second portion to the external electronic device during the first portion of the other iteration of the specified period of time.

10. The apparatus of claim 1, wherein the control unit is further adapted to:
determine the specified period of time based at least in part on a characteristic of the data.

11. The apparatus of claim 1, wherein the control unit is further adapted to:
transmit the time information to the external electronic device as at least part of a beacon.

12. An apparatus comprising:
a memory;
an antenna;
a communication unit operatively coupled with the antenna and adapted to transmit a signal to an external electronic device using the antenna; and
a control unit operatively coupled with the communication unit, the control unit adapted to:
operate in a first state during a first portion of a specified period of time period, the operating in the first state including transmitting, using the communication unit, at least one portion of data stored in the memory to the external electronic device during the first portion of the specified period of time, and
operate in a second state during a second portion of the specified period of time in response to elapsing the first portion, the operating in the second state including:
suspending from transmitting a portion of the data during the second portion of the specified period of time,
transmitting, using the communication unit, a beacon including time information to be used for communication between the apparatus and the external electronic device to the external electronic device during a first subportion of the second portion of the specified period of time, and
operating in a sleep state during a second subportion of the second portion after the elapse of the first subportion.

13. The apparatus of claim 12, wherein the control unit is further adapted to:
determine the specified period of time based at least in part on a characteristic of the data.

14. The apparatus of claim 12, wherein the control unit is further adapted to:
as at least part of the operating in the first state, operate in a wake-up state during the first portion.

15. The apparatus of claim 12, wherein the control unit is further adapted to:
buffer another portion of the data during the second portion of the specified period of time.

16. The apparatus of claim 15, wherein the control unit is further adapted to:
operate in the first state during a first portion of another iteration of the specified period of time after the elapse of the second portion, the operating in the first state during the first portion of the other iteration including transmitting the other portion of the data buffered during the second portion to the external electronic device during the first portion of the other iteration of the specified period of time.

17. An apparatus comprising:
a memory;
an antenna;
a communication unit operatively coupled with the antenna and adapted to transmit a signal to an external electronic device using the antenna; and
a control unit operatively coupled with the communication unit, the control unit adapted to:
transmit, using the communication unit, at least one portion of data stored in the memory to the external electronic device during a portion of a specified period of time,
suspend from transmitting a portion of the data or a beacon to the external electronic device during a first subportion of a remaining portion of the specified period of time in respond to elapsing the portion of the specified period of time, and
transmit, using the communication unit, at least one beacon to the external electronic device during a second subportion of the remaining portion of the specified period of time after the elapse of the first subportion,
wherein the control unit is further adapted to suspend from transmitting at least one portion of the data to the external electronic device during the second subportion.

18. The apparatus of claim 17, wherein the control unit is further adapted to:
determine the specified period of time based at least in part on a characteristic of the data.

19. The apparatus of claim 17, wherein the control unit is further adapted to:
buffer another portion of the data during the remaining portion of the specified period of time.

20. The apparatus of claim 17, wherein the control unit is further adapted to:
operate in a sleep state during a third subportion of the remaining portion of the specified period of time after the elapse of the second subportion and until an end of the remaining portion.

* * * * *